US011685834B2

(12) United States Patent
Stracke et al.

(10) Patent No.: US 11,685,834 B2
(45) Date of Patent: Jun. 27, 2023

(54) AQUEOUS EMULSION INCLUDING INTERPENETRATING NETWORK OF SILICON RESIN AND ORGANIC POLYMERS

(71) Applicant: Dow Silicones Corporation, Midland, MI (US)

(72) Inventors: Jordan Stracke, Midland, MI (US); Yihan Liu, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 0 days.

(21) Appl. No.: 17/921,175

(22) PCT Filed: Nov. 16, 2021

(86) PCT No.: PCT/US2021/059433
§ 371 (c)(1),
(2) Date: Oct. 25, 2022

(87) PCT Pub. No.: WO2022/173478
PCT Pub. Date: Aug. 18, 2022

(65) Prior Publication Data
US 2023/0125136 A1    Apr. 27, 2023

Related U.S. Application Data

(60) Provisional application No. 63/149,422, filed on Feb. 15, 2021.

(51) Int. Cl.
| | |
|---|---|
| *C08L 83/04* | (2006.01) |
| *D06M 15/643* | (2006.01) |
| *D06N 3/00* | (2006.01) |
| *D06N 3/12* | (2006.01) |
| *D06M 15/263* | (2006.01) |
| *D06N 3/04* | (2006.01) |
| *C09D 183/04* | (2006.01) |
| *D06M 101/34* | (2006.01) |
| *D06M 101/32* | (2006.01) |

(52) U.S. Cl.
CPC ............ *C08L 83/04* (2013.01); *C09D 183/04* (2013.01); *D06M 15/263* (2013.01); *D06M 15/643* (2013.01); *D06N 3/0088* (2013.01); *D06N 3/042* (2013.01); *D06N 3/128* (2013.01); *C08L 2205/04* (2013.01); *D06M 2101/32* (2013.01); *D06M 2101/34* (2013.01); *D06M 2200/12* (2013.01); *D06N 3/0034* (2013.01); *D06N 3/0036* (2013.01); *D06N 2201/02* (2013.01); *D06N 2201/0263* (2013.01); *D06N 2203/066* (2013.01); *D06N 2205/023* (2013.01)

(58) Field of Classification Search
None
See application file for complete search history.

(56) References Cited

U.S. PATENT DOCUMENTS

| | | | | |
|---|---|---|---|---|
| 5,973,068 | A * | 10/1999 | Yamaya | C09D 183/04 524/588 |
| 7,767,747 | B2 * | 8/2010 | Lind | C08F 283/12 524/506 |
| 7,998,583 | B2 | 8/2011 | Minge et al. | |
| 9,808,413 | B2 * | 11/2017 | Abe | A61K 8/86 |
| 10,584,263 | B2 * | 3/2020 | Pirrung | C09D 11/033 |
| 2019/0375897 | A1 * | 12/2019 | Gotou | D06M 13/507 |
| 2019/0382581 | A1 * | 12/2019 | Di Giovanni | C08G 77/04 |
| 2020/0317906 | A1 * | 10/2020 | Gernandt | C08F 2/38 |
| 2020/0332148 | A1 * | 10/2020 | Gotou | C09K 3/18 |

FOREIGN PATENT DOCUMENTS

| | | |
|---|---|---|
| CN | 102558730 B | 12/2013 |
| JP | 2017218713 A | 12/2017 |
| WO | 2019001901 A1 | 1/2019 |

OTHER PUBLICATIONS

DOWSIL™ IE-8749 Dow product brochure (2020).

\* cited by examiner

*Primary Examiner* — Peter A Salamon

(74) *Attorney, Agent, or Firm* — Edward Black

(57) ABSTRACT

An aqueous emulsion comprising an aqueous continuous phase and a discontinuous oil phase comprising particles having an interpenetrating network (IPN) comprising: i) an MQ resin, ii) a polyorganosiloxane and iii) an organic polymer.

11 Claims, No Drawings

AQUEOUS EMULSION INCLUDING INTERPENETRATING NETWORK OF SILICON RESIN AND ORGANIC POLYMERS

CROSS REFERENCE TO RELATED APPLICATIONS

This application claims the benefit of U.S. Provisional Patent Application Ser. No. 63/149,422 filed on 15 Feb. 2021 under 35 U.S.C. § 119 (e). U.S. Provisional Patent Application Ser. No. 63/149,422 is hereby incorporated by reference.

FIELD

This invention is directed toward aqueous emulsions including a discontinuous oil phase of to particles having an interpenetrating network of silicon resin and an organic polymer. These emulsions find particular utility in treating textiles to improve water repellency.

INTRODUCTION

Textiles such as fabrics used in clothing are commonly treated to impart water repellency. While fluoropolymers have been historically used in such treatments, environmental and health concerns have curtailed their use. More recent efforts have focused on the use of silicone (polyorganosiloxane) compositions. One commercial example is DOWSIL™ IE-8749 brand emulsion from The Dow Chemical Company. This product may be combined with a blocked isocyanate crosslinker and a glycol penetrant to prepare a formulated finishing bath which is applied to a textile and cured at elevated temperature, e.g. at 160° C. for several minutes.

US2019/0375897 describes another silicone-based water repellant comprising an amino-modified silicone, a silicon resin and a polyfunctional isocyanate compound.

Combinations of aqueous silicone emulsions with organic binders have also been described. For example, US2019/0382581 describes an aqueous emulsion including particles of a silicone resin with a siloxane carrier along with an organic binder. While directed toward use in films and coatings, this reference includes a passing reference to leather and textile applications. Similarly, US2020/0332148 describes an aqueous emulsion for treating textiles including an amino-modified silicone, a silicone resin and a polyorganosiloxane (e.g. polydimethylpolysiloxane, decamethylcyclopentasiloxane, octamethyl cyclotetrasiloxane, etc.). This reference further describes the inclusion of a poly(meth)acrylic acid ester. In both publications, the inorganic polymer (silicone resin and polyorganosiloxane) and the organic polymer are present as distinct particles within the emulsion. These types of emulsions have failed to provide a desired combination of durability and softness. The industry continues to seek improved water repellant compositions and related textile treatments.

SUMMARY

The inventors of the present invention discovered that use of an aqueous emulsion including a discontinuous oil phase including particles having an interpenetrating network of inorganic polymers (silicon resin and polyorganosiloxane) and an organic polymer provides superior performance as compared with emulsions including these components as distinct particles.

In one aspect, the present invention includes an aqueous emulsion comprising an aqueous continuous phase and a discontinuous oil phase comprising particles having an interpenetrating network (IPN) comprising: i) an MQ resin, ii) a polyorganosiloxane and iii) an organic polymer. In another aspect of the present invention, the subject emulsion is substantially free of fluoropolymers and/or cyclic siloxanes such as octamethylcyclotetrasiloxane (D4), decamethylcyclopentasiloxane (D5) and dodecamethylcyclohexasiloxane (D6). In another aspect, the present invention includes a method for making the subject emulsions. In still another aspect, the invention includes a method of treating a to textile. In yet another aspect, the invention includes a textile treated with the subject emulsion. Many embodiments are described.

DETAILED DESCRIPTION

As used herein, the term "textile" refers to a flexible material consisting of a network of natural or synthetic fibers. Representative fibers include cotton, flax, hemp, silk, wool, rayon, cellulose, linen, nylon, polypropylene, polyether-polyurea copolymer (e.g. "spandex") and polyester. "Textiles" specifically include non-woven and woven fabrics produced by weaving, knitting, spreading, felting, stitching, crocheting or bonding such fibers. In selected embodiments of the invention, the fabric of interest is that used in the manufacture of clothing (e.g. garments) where softness, water resistance and durability after repeated cleaning (washing, dry cleaning, etc.) are desired.

As previously introduced, the subject emulsions include a continuous aqueous phase comprising water. The water may be from any source and may optionally be purified, e.g. through filtration, distillation, reverse osmosis techniques, etc. As will be more fully described, the emulsion further comprises a surfactant. The surfactant may alternatively be referred to as an emulsifier and generally serves to emulsify the discontinuous (oil) phase within the aqueous phase of the emulsion.

The discontinuous oil phase of the emulsion comprises: i) a MQ resin, ii) a polyorganosiloxane and iii) an organic polymer. The polymers of the discontinuous oil phase comprise an interpenetrating polymer network. As used herein, the term "interpenetrating polymer network" (IPN) refers to a polymeric material comprising two or more networks (polymers) which are at least partially interlaced (e.g. physically entangled) on a molecular scale but not covalently bonded to each other. The lack of covalent bonding distinguishes IPNs from block copolymers and graft copolymers. The presence of physical entanglement between the networks suppresses creep and flow; however, the lack of covalent bonding allows for some migration (i.e. separation) of one network from another. The subject IPNs may also be referred to as class I hybrid or blend. As will be described in more detail, the present IPNs are prepared by imbibing organic monomers within an inorganic polymer phase (MQ resin and polyorganosiloxane) followed by in-situ polymerization of the organic monomers to form an organic polymer that is at least partially interlaced within the inorganic polymer. More specifically, a discontinuous oil phase is prepared by emulsifying an MQ resin and polyorganosiloxane along with organic monomers. These components are generally miscible (i.e. form an optically transparent mixture when viewed with unaided eye) with each other, but upon polymerization, the nascent organic polymer ("organic phase") becomes immiscible with the MQ resin and polyorganosiloxane ("silicone phase" or "inorganic phase").

While not wishing to be bound by theory, it is believed that when used to treat a textile, the silicone phase provides water repellency while the organic phase provides reinforcement to the resulting textile coating and reduces the amount of the silicone phase migrating from the textile during washing and drying. For the silicone phase, the MQ resin is believed to provide good water repellency. The polyorganosiloxane is believed to provide a softening effect when used in specific ratios with the MQ resin. Importantly, the MQ resin is not covalently bonded with the organic polymer. This allows the MQ resin to migrate and provide improved water repellency.

i) MQ Resin (Trimethylsiloxysilicate Resin):

The subject discontinuous oil phase particles preferably comprise at least 10 wt % (e.g. 10 to 50 wt %) MQ resin. The MQ resins useful in the present invention include a well-known class of commercially available resins. Importantly however, in order to prepare the subject IPN, the MQ resin must be substantially free of radically polymerizable functional groups (e.g. vinyl, (meth)acrylic) that if present, would form covalent bonds with the monomer used in the preparation of the organic polymer. In this context, the term "substantially free" means less than 1 wt %, more preferably less 0.5 wt % and still more preferably 0.0 wt %, based upon the total weight of the MQ resin. Notwithstanding, the MQ may include functional groups so long as they do not substantially form covalent bonds with the organic monomers under the conditions used during free-radical polymerization. Specific examples of acceptable functional groups include alkoxy, amino, blocked isocyanate, carbinol, epoxy, hydrocarbyl and hydroxyl. The subject MQ resins have a number ratio of M siloxy units to Q siloxy unit is preferably greater than 0.7:1 as determined by $^{29}$Si NMR. The weight average molecular weight (Mw) of the subject MQ resins is preferably 8000 to 50,000 AMU (Daltons). Representative commercial examples of such resins include: DOWSIL™ MQ-1600 resin, DOWSIL™ MQ-1601 resin, DOWSIL™ 2-7066 resin, DOWSIL™ MQ-7466 resin and DOWSIL™ MQ-7366 resin, all of which are available from The Dow Chemical Company. Combinations of the subject MQ resins may be used together.

By way of background, silicone resins in general can be represented by the following:

$(R^1R^2R^3SiO_{1/2})_w(R^4R^5SiO_{2/2})_x(R^6SiO_{3/2})_y(SiO_{4/2})_z$, where $R^1$-$R^6$ are independently selected from hydrogen, hydroxyl, or any organic group, e.g. substituted or unsubstituted hydrocarbyl groups, alkoxy groups, amino groups, acetoxy groups and aminoxy groups, and w, x, y and z are independently from ≥0 to ≤1, with the provisos that y and z are not simultaneously 0 and w+x+y+z=1. Subscript w indicates M siloxy units, subscribe x indicates D siloxy units, subscribe y indicates T siloxy units and subscript z indicates Q siloxy units. The amount of each siloxy unit present in the resin is expressed as a mole fraction (through subscript w, x, y and z) of the total number of moles of all M, D, T, and Q siloxy units present in the silicone resin. The above formula is not intended to indicate a structural ordering of the various siloxy units, but rather to provide a convenient notation to describe the relative amounts of each type of siloxy unit in the resin, as per the mole fractions described above via the subscripts w, x, y and z. The mole fractions of the various siloxy units in the silicone resin may be readily determined by $^{29}$Si NMR techniques. When M and Q siloxy units predominate, by convention the resulting organosiloxane is referred to as a "MQ resin."

In certain embodiments, the subject resin consists essentially of MQ units. By "consist essentially of" with reference to the M and Q units in the resin, it is meant that w+z≥0.7, alternatively w+z≥0.85, alternatively w+z≥0.9, alternatively w+z≥0.95, alternatively w+z≥0.96, alternatively w+z≥0.97, alternatively w+z≥0.98, alternatively w+z≥0.99, alternatively w+z=1. Because w+x+y+z=1, when w+z≤1, the balance is attributable to the presence of at least some molar fraction of D and/or T siloxy units. As such, the MQ resin may include at least some D and/or T siloxy units based on the subscripts and mole fractions above. In other embodiments, the MQ resin consists of M and Q siloxy units.

The hydrocarbyl group(s), if any, represented by $R^1$-$R^3$ may independently be substituted or unsubstituted, and may be aliphatic, aromatic, cyclic, alicyclic, etc. Moreover, the hydrocarbyl group(s) represented by $R^1$-$R^3$ may include one or more heteroatoms replacing carbon atoms, e.g. N, S, or O may replace C in the hydrocarbyl group(s) represented by $R^1$-$R^3$. The term "substituted" as used in relation to a hydrocarbyl group means, unless indicated otherwise, one or more hydrogen atoms in the hydrocarbyl group has been replaced with another atom or substituent. Unsubstituted aliphatic hydrocarbyl groups are exemplified by, but not limited to, alkyl groups such as methyl, ethyl, propyl, pentyl, octyl, decyl, dodecyl, undecyl, and octadecyl; cycloalkyl groups such as cyclopentyl and cyclohexyl; aryl groups such as phenyl, tolyl, xylyl, and benzyl; and aralkyl groups such as 2-phenylethyl. Preferred unsubstituted aliphatic hydrocarbyl groups include methyl groups.

Applicable resins can be made in solvent or in situ, e.g. by hydrolysis of certain silane materials. A particularly preferred methodology is the hydrolysis and condensation in the presence of a solvent e.g. xylene of a precursor of the tetravalent siloxy unit (e.g. tetraorthosilicate, tetraethyl orthosilicate, polyethyl silicate or sodium silicate) and a precursor of mono-valent trialkylsiloxy units (e.g. trimethylchlorosilane, trimethylethoxy silane, hexamethyldisiloxane or hexamethyldisilazane). The resulting MQ resin can be further trimethylsilylated to react out residual Si—OH groups or can be heated in the presence of a base to cause self-condensation of the resin by elimination of Si—OH groups ii) Polyorganosiloxane:

The subject discontinuous oil phase particles preferably comprise at least 25 wt % (e.g. 25 to 80 wt %) of polyorganosiloxane. The polyorganosiloxanes used in the present invention are not particularly limited and include both linear and branched species preferably having a weight average molecular weight (Mw) of from 500 to 100,000 AMU (Daltons), more preferably from 1000 to 10,000 and still more preferably from 1000 to 5000. In selected embodiments, the subject polyorganosiloxanes are substantially free of volatile cyclic siloxanes including D4, D5 and D6. In this context, the term "substantially free" means less than 1 wt %, more preferably less 0.5 wt % and still more preferably 0.0 wt %, based upon the total weight of the polyorganosiloxanes. Moreover, in other selected embodiments, the subject polyorganosiloxane is substantially free of Q siloxy units. In this context, the term "substantially free" means less than 1 wt %, more preferably less 0.5 wt % and still more preferably 0.0 wt %, based upon the total weight of the polyorganosiloxanes. Representative sub-classes of applicable polyorganosiloxanes include polyalkylsiloxanes, polyarylsiloxanes, polyalkylarylsiloxanes. Applicable commercial examples include DOWSIL™ 200 fluids (trimethyl silyl terminated to polydimethylsiloxane) which is available in a wide variety of viscosities from The Dow Chemical Company. Preferred viscosity ranges are from 5 to 100,000 mPa·s (cSt) and more preferably from 10 to 70,000 mPa·s. Unless otherwise indicated, the term "viscosity" refers to dynamic viscosity at 25° C. using a rotational viscometer (Brookfield DVII) according ASTM D2196-05. Combinations of different polyorganosiloxanes may be used together.

The weight ratio of the i) MQ resin to the ii) polyorganosiloxane is preferably from 1:0.5 to 1:5. This range provides a preferred balance of water repellency and softness.

Applicable polyorganosiloxanes may be represented by:

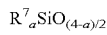

where each $R^7$ is independently selected from the groups defined above with respect to $R^1$-$R^6$ and "a" is a number preferably between 1.8 to 2.5 and more preferably 1.95 to 2.05). And unlike the restriction of the MQ resin described above, the polyorganosiloxane may include functional groups that covalently bond with the monomers used to prepare the organic polymer. That is, $R^7$ may further be independently selected from functional groups including an ethylenically unsaturated group such as vinyl, (meth)acrylic and acrylic.

iii) Organic Polymer:

The subject discontinuous oil phase particles preferably comprise from 1 to 50 wt % organic polymer having a glass transition (Tg) temperature of 0 to 150° C. As used herein, the term "organic polymer" refers to a reaction product of ethylenically unsaturated organic monomers polymerized via a radical mechanism. The ethylenically unsaturated organic monomers are preferably selected from one or more of: acrylates, vinyl esters, vinyl aromatics, olefins, 1,3-dienes and vinyl halides, with particular preference towards one or more of acrylates and vinyl aromatics. In selected embodiments, the subject organic polymers do not include siloxy functional groups.

As used herein, the term "acrylate" or "acrylate monomer" refers to monomers based upon acrylic acid along with salts, esters and conjugate bases thereof. Representative "acrylate monomers" include: methacrylates, substituted acrylates and substituted methacrylates. Specific examples include acrylate esters and methacrylate esters such as methyl acrylate, ethyl acrylate, butyl acrylate, t-butyl acrylate, 2-ethylhexyl acrylate, methyl methacrylate, decyl acrylate, lauryl acrylate, isodecyl methacrylate, lauryl methacrylate, and butyl methacrylate; substituted acrylates and methacrylates such as hydroxyethyl acrylate, perfluorooctyl acrylate, hydroxypropyl acrylate, hydroxypropyl methacrylate, and hydroxyethyl methacrylate. Representative "acrylic acids" include acrylic acid, methacrylic acid, ethylacrylic acid and corresponding salts thereof.

Representative "vinyl halides" include vinyl chloride, vinylidene chloride, and chloroprene. Additional examples of applicable monomers include: maleic anhydride, "vinyl esters" such as vinyl acetate and vinyl butyrate; vinyl pyrrolidone; conjugated dienes such as butadiene and isoprene; "vinyl aromatics" such as styrene and divinyl benzene; vinyl monomers such as ethylene; acrylonitrile and to methacrylonitrile; acrylamide, methacrylamide, and N-methylol acrylamide; and vinyl esters of monocarboxylic acids with up to 10 carbon atoms.

The subject monomers may include species having multi-ethylenically unsaturated groups, i.e. comprising at least two polymerizable carbon-carbon double bonds which under appropriate reaction conditions, are subject to free radical polymerization. Applicable examples include allyl methacrylate, diallyl phthalate, 1,4-butylene glycol dimethacrylate, 1,2-ethylene glycol dimethacrylate, 1,6-hexanediol diacrylate, and divinyl benzene.

The total weight percent is important for providing a superior textile treatment. For example, the inclusion of greater than 50 wt % of the organic polymer within the particles of the discontinuous oil phase results in a textile coating that is brittle. Consequently, the total weight percent of the subject organic polymer in the oil phase particles (including the MQ resin and polyorganosiloxane) is preferably from 1 to 50 wt %, more preferable from 5 to 45 wt % and still more preferably from 10 to 40 wt %.

The subject organic polymers preferably have a glass transition (Tg) temperature of 0 to 150° C., more preferably from 1 to 50° C. and still more preferably from 10 to 40° C. The use of polymers having Tg values below 0° C. reduces the water repellency provided by the resulting emulsion. The Tg of the subject organic polymer can be determined based upon a theoretical polymer having a weight average molecular weight (Mw) of 50,000, calculated using the Fox equation (T. G. Fox, Bull. Am. Physics Soc., Volume 1, Issue No. 3, page 123 (1956)). For example, to calculate a Tg of a copolymer of a monomer mixture of monomers M1 and M2, $1/Tg=w(M1)/Tg(M1)+w(M2)/Tg(M2)$, wherein $w(M1)$ is the weight fraction of monomer M1 in the copolymer, $w(M2)$ is the weight fraction of monomer M2 in the copolymer, $Tg(M1)$ is a published glass transition temperature ("Fox Tg") of a high molecular weight homopolymer (>50 k weight average MW) of M1, $Tg(M2)$ is a published glass transition temperature of a high molecular weight homopolymer of M2. Tg values for homopolymers are listed in the Polymer Handbook, 4' Edition, J. Wiley & Sons, New York (2003).

Various additives may be included in the subject emulsions, including during the preparation of the initial discontinuous oil phase, during the in-situ polymerization of the organic and/or thereafter. Examples of such additives include surfactants, initiators, penetrants, melamine, wax, polyurethane dispersions, etc. One such optional additive includes blocked isocyanates.

iv) Blocked Isocyanate:

As mentioned, the subject emulsions may further include one or more blocked isocyanates. The term "blocked isocyanate" as used herein refers to a reaction product of an isocyanate and a blocking agent, wherein the blocking agent is removable from the isocyanate under the thermal conditions, i.e. those typically used while treating a textile. Conventional blocking agents include aryl alcohols, alkanone oximes, aryl thioles, organic active hydrogen compounds, sodium bisulfate and hydroxylamine. Preferred blocking agents include alkanone oximes (ketoximes) which can be de-blocked at a relatively low temperature such as used during a typical textile treatment process. For purposes of the present invention, "aromatic" blocked polyisocyanates are preferred. In this context the term "aromatic" means isocyanate compounds with at least one aromatic group, such as materials based on toluene diisocyanate, diphenylmethane 4,4' diisocyanate, diphenylmethane 2,4' diisocyanate, polymethylene-polyphenyl isocyanate, 4,4' methylene bisphenol isocyanate, and derivatives thereof. Suitable isocyanates $A(CNO)_z$ for preparation of the blocked isocyanate are those wherein A is an aromatic compound, and z is 1, 2, 3 or 4. These include isocyanates or derivatives such as toluene diisocyanate, polymethylenepolyphenyl isocyanate, and 4,4' methylene bisphenol isocyanate, and include those aromatic isocyanates sold commercially for this purpose. Typical commercial products include products such as the adduct of toluene diisocyanate and trimethylolpropane (1,1,1 trihydroxymethyl propane) DESMODUR CB-75; (available from Covestro), aromatic isocyanates based on the polymethylenepolyphenylene ester of isocyanic acid, such as MONDUR MR-100 (available from Covestro), and aromatic isocyanates based on polymethylenepolyphenyl isocyanate containing 4,4' methylene bisphenol isocyanate (available from The Dow Chemical Co.). Also available commercially are ready-made blocked aromatic isocyanates such as HYDROPHOBOL DL, PHOBOL XAN (available from Huntsman), DM-6400, MEIKANATE FM-1, MEIKANATE ST, MEIKANATE PRO, MEIKANATE TP-10, MEIKANATE WEB, MEIKANATE ST (available from Meisei Chemical Works, Ltd.). Further background information regarding such isocyanates is provided in US2019/0375897, US839255 and U.S. Pat. No. 6,451,717.

The particles of the discontinuous oil phase preferably have an average volume particle size "D(v0.5)" of from 10 to 5000 nm and more preferably from 50 to 3000 nm as determined via laser diffraction using a Malvern 3000 and in accordance with ISO 13320 (2009). As used herein, the term "particles" refers to the oil phase droplets.

In selected embodiments, the subject emulsions are substantially free of fluoropolymers and/or cyclic siloxanes such as octamethylcyclotetrasiloxane (D4), decamethylcyclopentasiloxane (D5) and dodecamethylcyclohexasiloxane (D6). In this context, the term "substantially free" means less than 1 wt %, more preferably less 0.5 wt % and still more preferably 0.0 wt %, based upon the total weight of the discontinuous oil phase.

The discontinuous oil phase of the subject emulsions preferably comprises from 5 to 80 wt % and more preferably from 10 to 60 wt % based upon the total weight of the emulsion.

While directed toward cosmetics applications, U.S. Pat. No. 98,008,413 describes emulsions prepared in a similar manner to the present invention. However, both the Tg and the total weight of the organic polymer as described are unsuited for textile treatment, e.g. the organic polymer is present in an amount greater than 50 wt % (e.g. >66 wt %) of the hybrid silicone-organic particle which results in too brittle of a coating to be effective for textiles. Similarly, U.S. Pat. No. 7,767,747 describes a method for preparing hybrid emulsions including both polysiloxane and organic polymers, albeit without the use of silicone resins. While neither of these patents describe the subject emulsions or the treatment of textiles, their general methodology as described is instructive.

With specific reference to the present invention, the method for preparing the subject emulsion includes the steps of: (1) obtaining or preparing an aqueous emulsion comprising a discontinuous oil phase comprising particles which comprise: i) MQ resin substantially free of radically polymerizable functional groups; ii) polyorganosiloxane; and iii) ethylenically unsaturated organic monomers selected from one or more of: acrylates, vinyl esters, vinyl aromatics, olefins, 1,3-dienes, and vinyl halides; and (2) polymerizing the ethylenically unsaturated organic monomers in situ to form an interpenetrating network within the particles. With respect to step (1), the order of addition of each constituent is not particularly limited and the additional use of surfactants and mixing may be used to facilitate the formation of an emulsion along with control of particle size. With respect to step (2), initiators and the use of elevated temperatures (e.g. 70 to 95° C.) may be used to facilitate free radical polymerization of the organic monomers.

Mixing may occur using any known techniques in the emulsion art. Typically, the oil phase and aqueous phase including any surfactant are combined using simple stirring techniques to form an emulsion. Representative mixing devices include homogenizer, sonolator, rotor-stator turbines, colloid mill, microfluidizer, sonicator, blades, helix and combination thereof. Representative methodologies are described in U.S. Pat. Nos. 6,013,682, 8,877,293 and US2015/0010711.

Examples of applicable surfactants include cationic, anionic and/or non-ionic surfactants with preference toward cationic surfactants. As used herein, the term "cationic surfactant" means a surfactant that has a functional group having a positive charge, e.g. quaternary ammonia compounds with positively charged surface-active moieties. This definition includes amphoteric surfactants which have both positive and negatively charged groups but excludes non-ionic and anionic surfactants. Cationic surfactants useful in this invention might be quaternary ammonium hydroxides such as octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide and coco trimethyl ammonium hydroxide as well as corresponding salts of these materials, fatty amines and fatty acid amides and their derivatives, basic pyridinium compounds, quaternary ammonium bases of benzimidazolines and polypropanol-polyethanol amines but is not limited to this list of cationic surfactants. Alternatively, the cationic surfactant is cetyl trimethyl ammonium chloride. These surfactants may be used individually or in combination. The surfactant is dissolved in water and the resulting aqueous solution used as a component in the aqueous continuous phase. The concentration of the cationic surfactant during the formation of the oil in water emulsion is preferably between 0.5% and 4.0% by weight of the entire oil phase. Auxiliary surfactants, and in particular nonionic surfactants, may be added during the formation of the oil in water emulsion. Suitable non-ionic surfactants are; polyoxyalkylene alkyl ethers such as polyethylene glycol long chain (12 to 14 carbons) alkyl ether, polyoxyalkylene sorbitan ethers, polyoxyalkylene alkoxylate esters, polyoxyalkylene alkylphenol ethers, ethylene glycol propylene glycol copolymers, polyvinyl alcohol and alkylpolysaccharides. Additional water-soluble constituents to may be added to the aqueous phase including thickeners and preservatives.

Examples of applicable water-soluble free radical initiators include t-butyl peroctoate and t-butylperoxy-2-ethylhexanoate. Thermal or redox initiation processes may be used in the preparation of the organic polymer. Conventional thermal free radical initiators which can be used include hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid. These initiators are typically used at a level of 0.1 to 5.0 wt % based on the total weight of organic monomer. Redox initiators which can be used are typically an oxidant plus a reducing agent in combinations effective to generate free radicals, including the same free radical initiators listed above as the oxidant; and a suitable reductant such as sodium sulfoxylate formaldehyde, ascorbic acid, isoascorbic acid, alkali metal and ammonium salts of sulfur-containing acids such as sodium sulfite, bisulfite, thiosulfate, hydrosulfite, sulfide, hydrosulfide or dithionite, formamidine sulfinic acid, hydroxymethane sulfonic acid, acetone bisulfite; amines such as ethanolamine, glycolic acid, glyoxylic acid hydrate, lactic acid, glyceric acid, malic acid, tartaric acid, as well as salts of the preceding acids which may be used. The initiator or initiator system can be added in one or more additions, continuously, linearly, or not, over the reaction period, or as combinations thereof. Several azo-type organic free radical initiators which may be used in the monomer swell process such as azobis-isobutyronitrile and azobispropionitrile.

Applicable methods of treating textiles with the subject emulsions are not particularly limited and include applying the emulsion to the textile by dipping, padding (e.g. via a roll padder), curtain coating, brush coating, roll coating and spraying methods such as air-atomized spray, air-assisted spray, airless spray, high volume low pressure spray and air-assisted airless spray. The resulting coating is then dried (cured) at elevated temperature from 80 to 180° C. Examples of the drying steps include air drying at room temperature, hot air drying and infrared heating. Typical coating coverages are in the range of 0.5-15 grams dry weight per square meter ($g/m^2$).

Many embodiments of the invention have been described and, in some instances, certain embodiments, selections, ranges, constituents, or other features have been characterized as being "preferred." Such designations of "preferred" features should in no way be interpreted as an essential or critical aspect of the invention. Expressed ranges specifically include designated end points. As used herein, the terms "molecular weight" and "Mw" refer to the weight average molecular weight as measured by gel permeation chromatography (GPC)

EXAMPLES

Unless otherwise indicated, all preparation and testing were conducted at room temperature (RT) at standard pressure (1 atm or 760 mm Hg). The following materials were used in the preparation and testing of aqueous emulsions:

TABLE 1

Description of materials used in Examples

| Material Type | Product Name | Chemical Description | Source |
|---|---|---|---|
| Monomer | Styrene | Styrene | Sigma-Aldrich |
| Monomer | n-butyl acrylate | n-butyl acrylate | Sigma-Aldrich |
| Monomer | methyl methacrylate | methyl methacrylate | Sigma-Aldrich |
| Monomer | AAEM | acetoacetoxy ethyl methacrylate | Sigma-Aldrich |
| Monomer | IBOMA | isobornyl methacrylate | Sigma-Aldrich |
| Monomer | MD'M-ALMA | (structure shown) | Dow |
| Radical Initiator | Luperox ® 26 | t-butyl peroctoate, t-butylperoxy 2-ethylhexanoate | Arkema |
| Polyorganosiloxane | SILASTIC ™ SFD-128 Approx. 60,000 cSt | vinyl dimethylsilyl terminated polydimethylsiloxane | Dow |
| Polyorganosiloxane | DOWSIL ™ 200 Fluid (20, 50 & 1000 cSt) | trimethyl silyl terminated polydimethylsiloxane | Dow |
| MQ Resin | DOWSIL ™ MQ-1600 Resin | trimethylsiloxysilicate resin Mw = 23000 | Dow |
| MQ Resin | DOWSIL ™ 2-7066 Silicone | trimethylsiloxysilicate resin Mw = 17000 | Dow |
| MQ Resin | MQ Resin 2 | trimethylsiloxysilicate resin $(R_3SiO_{1/2})_{0.51}(SiO_{4/2})_{0.49}(ZO_{1/2})_{0.04}$ where R is methyl, Z is approx. 9:1 mole ratio of H and isopropyl; Mw = 7400 | Prepare as per U.S. Pat. No. 8,017,712 & U.S. Pat. No. 5,548,053. |
| Surfactant | TERGITOL ™ 15-S-20 | non-ionic surfactant | Dow |
| Surfactant | ARQUAD ® 16-29 | cationic surfactant | Nouryon |
| Blocked Isocyanate | PHOBOL ® XAN Extender | cationic dispersion of blocked isocyanate | Huntsman |
| Fabric | Nylon Fabric | Nylon/Spandex (99%/1%), No. 1194 075 | Burlington |
| Fabric | PES Fabric | Polyester, No. 4774 075 | Burlington |
| Seam Tape | TAF-900 | Polyamide adhesive, polyurethane backed tape | Adhesive Films, Inc. |

Sample Emulsions were Prepared According to the Following Methodologies:

Emulsion 1: MQ-1600/PDMS/Styrene-Acrylic Hybrid Colloid

Emulsion Preparation: Mixed MQ-1600 (13.3 g), 50 cSt 200 Fluid (26.6 g), butyl acrylate (5.00 g), styrene (11.17 g), AAEM (1.12 g) in a jar. Added water (10.64 g), ARQUAD 16-29 (1.40), TERGITOL™ 15-S-20 (80% active, 1.39 g), and mixed again to form a coarse emulsion. Added water (140.59 g) and emulsified the mixture using a sonic probe (Fisherbrand model 705) at 75% power for 1.5 minutes. Added dilution water (148.74 g).

Radical Polymerization Procedure: Added the emulsion to a glass reactor fitted with a stirring shaft, nitrogen flow, and thermocouple-controlled heating mantle. The emulsion was heated to 70.0° C. In a separate glass vial, LUPEROX 26 (0.68 g), TERGITOL™ 15-S-20 (80% active, 0.09 g), and water (0.7 g) were mixed together to prepare the initiator emulsion. This emulsion was added to the glass reactor along with a water rinse (4.7 g). After 30 minutes, the temperature was increased to 85.0° C. After 60 minutes, the temperature was increased to 92.0° C. and held there for 60 minutes before cooling the reactor.

Emulsion 2: MQ-1600/PDMS Emulsion (No Organic Polymer)

A mixture of 20 cSt 200 Fluid (12.71 g) and MQ-1600 (6.34 g) were combined in a high-speed dental mixer at 3500 rpm. ARQUAD 16-29 (1.88 g) was added and mixed again. Water was added in the following increments with high speed mixing in between additions: 5.25, 5.66, 2.21, 4.04, 2.00, and 2.21 g.

Emulsion 3: Styrene-Acrylic Emulsion Polymer (No MQ, No PDMS)

Emulsion Preparation: Mixed butyl acrylate (9.99 g), styrene (22.37 g), AAEM (2.16 g). Added water (16.92 g), ARQUAD 16-29 (1.04), TERGITOL™ 15-S-20 (80% active, 1.05 g), and mixed to form a coarse emulsion. Added water (100.00 g) and mixed using a sonic probe at 50% power for 1.5 minutes. Added dilution water (140.21 g). Radical polymerization procedure was the same as for Emulsion 1. Emulsion 4: MQ-1600/PDMS/Vinyl-PDMS/Styrene-Acrylic Hybrid Colloid Mixed MQ-1600 (11.24 g), 20 cSt 200 Fluid (11.24 g), SFD-128 ($M^{Vi}D_{766}M^{Vi}$, 11.24 g), butyl acrylate (4.22 g), styrene (9.42 g), AAEM (0.91 g) until homogeneous. Added water (84.71 g), ARQUAD 16-29 (1.13), TERGITOL™ 15-S-20 (80% active, 1.16 g), and mixed to form a coarse emulsion. Added water (33.15 g) and mixed using a sonic probe at 50% power for 1.5 minutes and 100% power for 1 minute. Homogenized using a Microfluidics homogenizer at 10,000 psi. Added dilution water (100.0 g). Radical polymerization procedure was the same as for Emulsion 1.

Emulsion 5: MQ-1600/PDMS/Styrene-Acrylic Hybrid Colloid with 4:1 PDMS:MQ

Mixed MQ-1600 (8.05 g), 20 cSt 200 Fluid (32.2 g), butyl acrylate (5.00 g), styrene (11.17 g), AAEM (1.12 g) until homogenous. Added water (99.11 g), ARQUAD 16-29 (1.35), TERGITOL™ 15-S-20 (80% active, 1.35 g), and mixed using a sonic probe at 75% power for 1.5 minutes. Added dilution water (134.42 g). Radical polymerization procedure was the same as for Emulsion 1.

Emulsion 6: MQ 2-7066 Silicone/PDMS/Styrene-Acrylic Hybrid Colloid

Mixed DOWSIL™ 2-7066 Silicone (17.2 g of 78 wt % resin in xylene) with 20 cSt 200 Fluid (26.8 g) and removed solvent under reduced pressure (~5 torr) at 70° C. for 2 hours. Added butyl acrylate (5.00 g), styrene (11.17 g), AAEM (1.08 g) and mixed until homogenous. Added water (150.6 g), ARQUAD 16-29 (1.35), TERGITOL™ 15-S-20 (80% active, 1.35 g), and mixed using a sonic probe at 75% power for 1.5 minutes. Added dilution water (82.93 g). Radical polymerization procedure was the same as for Emulsion 1.

Emulsion 7: MQ-1600/PDMS/Styrene-Acrylic Hybrid Colloid with 1000 cSt PDMS

Mixed MQ-1600 (13.40 g), 1000 cSt 200 Fluid (26.83 g), butyl acrylate (5.00 g), styrene (11.17 g), AAEM (1.08 g) until homogenous. Added water (101.75 g), ARQUAD 16-29 (1.35), TERGITOL™ 15-S-20 (80% active, 1.35 g), and mixed using a sonic probe at 75% power for 1.5 minutes. Added dilution water (131.8 g). Radical polymerization procedure was the same as for Emulsion 1.

Emulsion 8: MQ-1600/PDMS/Acrylic Hybrid Colloid (no styrene)

Mixed MQ-1600 (13.40 g), 20 cSt 200 Fluid (26.83 g), butyl acrylate (6.69 g), methylmethacrylate (9.47 g), and AAEM (1.08 g) until homogenous. Added water (150.6 g), ARQUAD 16-29 (1.35), TERGITOL™ 15-S-20 (80% active, 1.35 g), and mixed using a sonic probe at 75% power for 1.5 minutes. Added dilution water (82.94 g). Radical polymerization procedure was the same as for Emulsion 1.

Emulsion 9: MQ-1600/PDMS/Styrene-Acrylic Hybrid Colloid with 10% Styrene-Acrylic Mixed MQ-1600 (17.25 g), 20 cSt 200 Fluid (34.50 g), butyl acrylate (1.67 g), and styrene (3.72 g), and AAEM (0.36 g) in a glass jar. Added water (103.03 g), ARQUAD 16-29 (1.35), TERGITOL™ 15-S-20 (80% active, 1.35 g), and mixed using a sonic probe at 75% power for 2.0 minutes. Added dilution water (130.5 g). Radical polymerization procedure was the same as for Emulsion 1.

Emulsion 10: MQ-1600/PDMS/Acrylic Hybrid Colloid (no styrene)

Mixed MQ-1600 (13.40 g), 20 cSt 200 Fluid (26.83 g), MDM-ALMA (7.06 g), IBOMA (9.11 g), AAEM (1.08 g) until homogeneous. Added water (101.08 g), ARQUAD 16-29 (1.35), TERGITOL™ 15-S-20 (80% active, 1.35 g), and mixed using a sonic probe at 75% power for 1.5 minutes. Added dilution water (132.45 g). Radical polymerization procedure was the same as for Emulsion 1.

Emulsion 11: MQ-1600/PDMS/Styrene-Acrylic Hybrid Colloid (no AAEM)

Mixed MQ-1600 (13.40 g), 20 cSt 200 Fluid (26.83 g), butyl acrylate (5.66 g), and styrene (11.58 g) in a glass jar. Added water (150.6 g), ARQUAD 16-29 (1.35), TERGITOL™ 15-S-20 (80% active, 1.35 g), and mixed using a sonic probe at 100% power for 1.5 minutes. Added dilution water (82.94 g). Radical polymerization procedure was the same as for Emulsion 1.

Emulsion 12: MQ-1600/PDMS/Styrene-Acrylic Hybrid Colloid with 50% Styrene-Acrylic Followed the same emulsion and radical polymerization procedure as Emulsion 11 except the emulsion composition contained MQ-1600 (9.58 g), 20 cSt PDMS (19.16 g), butyl acrylate (8.33 g), styrene (18.61 g), AAEM (1.80 g).

Emulsion 13: MQ-1600/PDMS/Styrene-Acrylic Hybrid Colloid with Tg=15° C.

Followed the same emulsification and radical polymerization procedure as Emulsion 11 except the emulsion composition contained MQ-1600 (13.40 g), 20 cSt 200 Fluid (26.83 g), butyl acrylate (6.69 g), styrene (9.47 g), and AAEM (1.08 g) and the sonic probe was run at 75% power for 1.5 minutes.

Emulsion 14: MQ-1600/PDMS/Styrene-Acrylic Hybrid Colloid with Tg=−15° C.

Followed the same emulsification and radical polymerization procedure as Emulsion 11 except the emulsion composition contained MQ-1600 (13.40 g), 20 cSt 200 Fluid (26.83 g), butyl acrylate (10.40 g), styrene (5.78 g), and AAEM (1.08 g).

Emulsion 15: MQ Resin 2/PDMS/Styrene-Acrylic Hybrid Colloid

Mixed MQ Resin 2 (17.48 g of 76.6 wt % resin in xylene) with 20 cSt 200 Fluid (26.8 g) and removed solvent under reduced pressure (~5 torr) at 70° C. for 2 hours. Added butyl acrylate (5.00 g), AAEM (1.08 g) and mixed by hand. Added water (200.66 g), ARQUAD 16-29

(1.35), TERGITOL™ 15-S-20 (80% active, 1.35 g), and mixed using a sonic probe at 75% power for 1.5 minutes. Added dilution water (32.93 g). Radical polymerization procedure was the same as for Emulsion 1.

Emulsion 16: PDMS/Styrene-Acrylic Hybrid Colloid (no MQ resin)

Mixed vinyl terminated PDMS (SFD-128, 40.43 g), butyl acrylate (5.00 g), styrene (11.17 g), and AAEM (1.08 g) until homogeneous. Added water (0.41 g), ARQUAD 16-29 (1.35 g), TERGITOL™ 15-S-20 (80% active, 1.39 g), and mixed on a high-speed dental mixer at 3500 rpm for 30 s to form a water in oil emulsion. Water (39.29 g) was then added followed by mixing again at 3500 rpm for 30 s. The emulsion was diluted with water (206 g). Radical polymerization procedure was the same as for Emulsion 1.

allowed to equilibrate at room temperature/humidity for approximately 12 hours after which the coated fabric samples were laundered used a standard residential washer and dryer using TIDE® Free detergent. The wash cycle was set at 90° C. followed by a cold-water rinse. The drying cycle was set at high temperature with auto-sense shut-off.

Water repellency was measured using ISO 9865:1991 "Textiles—Determination of water repellency of fabrics by the Bundesmann rain-shower test". In summary, fabric samples were placed into the Bundesmann instrument where simulated rain struck the fabric surface for a period of 10 minutes after which the fabric was qualitatively rated for visual appearance (5=best, 1=worst/complete saturation of fabric surface by water).

TABLE 2

Summary of selected emulsions constituents:

| Sample | Viscosity of Polyorganosiloxanes (cSt) | MQ Resin | Calculated Tg of Organic Polymer | Weight % Organic Polymer |
|---|---|---|---|---|
| Emulsion 1 | 50 | MQ-1600 | 31 | 30 |
| Emulsion 2 (comparative) | 20 | MQ-1600 | N/A | 0 |
| Emulsion 3 (comparative) | N/A (no polyorganosiloxane) | N/A (no MQ resin) | 31 | 100 |
| Emulsion 4 | 20 and 60,000 | MQ-1600 | 31 | 30 |
| Emulsion 5 | 20 | MQ-1600 | 31 | 30 |
| Emulsion 6 | 20 | 2-7066 | 31 | 30 |
| Emulsion 7 | 1000 | MQ-1600 | 31 | 30 |
| Emulsion 8 | 20 | MQ-1600 | 17 | 30 |
| Emulsion 9 | 20 | MQ-1600 | 31 | 10 |
| Emulsion 10 | 20 | MQ-1600 | Not Calculated | 30 |
| Emulsion 11 | 20 | MQ-1600 | 30 | 30 |
| Emulsion 12 | 20 | MQ-1600 | 31 | 50 |
| Emulsion 13 | 20 | MQ-1600 | 15 | 30 |
| Emulsion 14 (comparative) | 20 | MQ-1600 | −15 (Tg below 0° C.) | 30 |
| Emulsion 15 (comparative) | 20 | MQ Resin 2 (low Mw) | 31 | 30 |
| Emulsion 16 (comparative) | 60,000 | N/A (no MQ resin) | 31 | 30 |

Coating emulsions (IE1-IE17, CE1-CE6) were prepared using the above described emulsions (Emulsions 1-16) and various fabrics samples (nylon and PES) were coated and tested according to the methodologies described below.

Coating emulsions (IE1-IE17, CE1-CE6) were coated onto fabrics samples via padding on a Mathis 2-roll padder (HVF-350) with roller pressure set to 60 psi and a rate of 2.0 m/min. Wet pickup of the nylon and polyester fabrics were 53% and 79%, respectively. The wet pickup is defined as the weight percent increase of the fabric after going through the treating solution and padder, but prior to drying. For example, if a fabric initially weighs 100 grams and after passing through the treating solution/padder the weight of the fabric is 150 grams, the wet pickup is 50%. Immediately after padding, the fabric was cured in a Mathis LTE oven at 160° C. for 3 minutes. The coated fabric samples were then Softness was determined on a subjective 1-5 scale wherein 1 was the harshest/roughest and 5 is the softest/smoothest.

Seam tape adhesion was determined using TAF-900 seam tape with ASTM method D413-98. The tape was applied to the fabric using a ChemInstruments HL-100 Hot Roll Laminator set at 245° F. Each fabric sample was laid on a silicone rubber mat and covered with a strip of tape ⅞ in. wide and 10 in. long. A mylar sheet was laid on top of the fabric/tape and fed into the laminator at a rate of 3.8 inch per minute and a roller pressure of 40 psi. After cooling to room temperature, the adhesion was measured using a TMI Lab Master 8091 Release and Adhesion Tester; the tape was peeled using a 180-degree geometry at a 12 inch per minute rate. Tape adhesion measurements were run in triplicate unless otherwise noted.

TABLE 3

Testing Results

| Sample No. | IE1 | CE1 | CE2 | IE2 | IE3 | IE4 | IE5 | IE6 | IE7 | IE8 |
|---|---|---|---|---|---|---|---|---|---|---|
| Emulsion 1 | 24.43 | | | | 13.76 | 13.76 | | | | |
| Emulsion 2 (no organic polymer) | | 8.31 | 5.82 | | | | | | | |

TABLE 3-continued

Testing Results

| Sample No. | IE1 | CE1 | CE2 | IE2 | IE3 | IE4 | IE5 | IE6 | IE7 | IE8 |
|---|---|---|---|---|---|---|---|---|---|---|
| Emulsion 3 (no MQ/PDMS) | | | 9.75 | | | | | | | |
| Emulsion 4 | | | | 27.29 | | | | | | |
| Emulsion 5 | | | | | | | 13.19 | | | |
| Emulsion 6 | | | | | | | | 20.49 | 13.19 | |
| Emulsion 7 | | | | | | | | | | 19.47 |
| PHOBOL ® XAN | 3.12 | 3.12 | 3.12 | 3.12 | | 2.11 | 2.11 | 3.28 | 2.11 | 3.12 |
| Water | 72.45 | 88.58 | 81.31 | 69.6 | 86.24 | 84.13 | 84.7 | 76.23 | 84.7 | 77.41 |
| Fabric Type Nylon = N, PES = P | N | N | N | N | P | P | P | N | P | N |
| Wt % on Fabric | 2.5 | 2.5 | 2.5 | 2.5 | 2 | 2.5 | 2.5 | 2.5 | 2.5 | 2.5 |

Results

| Sample No. | IE1 | CE1 | CE2 | IE2 | IE3 | IE4 | IE5 | IE6 | IE7 | IE8 |
|---|---|---|---|---|---|---|---|---|---|---|
| Visual Repellency (0 Wash Cycles) | 5 | 2 | 5 | 4 | 3 | 4 | 3.5 | 5 | 4.5 | 5 |
| Visual Repellency (10 Wash Cycles) | 5 | 1 | 1 | 4 | 3 | 3 | 5 | 4 | 4 | 4 |
| Softness | | | | | 3 | 3 | 2.5 | | 2 | |
| Tape Adhesion (g) | 2430 | 1681 | 1440 | | | | | >4K | | |
| Tape Adhesion, St. Dev. (g) | 8 | 141 | 248 | | | | | — | | |

TABLE 4

Testing Results

| Sample No. | IE9 | IE10 | IE11 | IE12 | IE13 | IE14 | IE15 | IE16 | IE17 |
|---|---|---|---|---|---|---|---|---|---|
| Emulsion 8 | 20.49 | | | | | | | | |
| Emulsion 9 | | 19.47 | 13.19 | | | | | | |
| Emulsion 10 | | | | 19.47 | 13.19 | | | | |
| Emulsion 11 | | | | | | 20.49 | 13.19 | | |
| Emulsion 12 (50 wt % organic polymer) | | | | | | | | 20.49 | 13.19 |
| PHOBOL ® XAN | 3.28 | 3.12 | 2.11 | 3.12 | 2.11 | 3.28 | 2.11 | 3.28 | 2.11 |
| Water | 76.23 | 77.41 | 84.7 | 77.41 | 84.7 | 76.23 | 84.7 | 76.23 | 84.7 |
| Fabric Type: Nylon = N, PES = P | N | P | N | N | P | N | P | N | P |
| Weight % on Fabric | 2.5 | 2.5 | 2.5 | 2.5 | 2.5 | 2.5 | 2.5 | 2.5 | 2.5 |

Results

| Sample No. | IE9 | IE10 | IE11 | IE12 | IE13 | IE14 | IE15 | IE16 | IE17 |
|---|---|---|---|---|---|---|---|---|---|
| Visual Repellency (0 Wash Cycles) | 5 | 3 | 5 | 5 | 3 | 5 | 4.5 | 5 | 5 |
| Visual Repellency (10 Wash Cycles) | 4 | 4 | 5 | 5 | 4 | 3 | 4 | 4 | 5 |
| Softness | | 3 | | | 3 | | 3 | | 1 |
| Tape Adhesion (g) | 2405 | | | 987 | | 2346 | | 3208 | |
| Tape Adhesion, St. Dev. (g) | 242 | | | 43 | | 18 | | 99 | |

TABLE 4

Testing Results

| Sample No. | CE3 | CE4 | CE5 | CE6 |
|---|---|---|---|---|
| Emulsion 14 (Tg below 0° C.) | 13.19 | | | |
| Emulsion 15 (low Mw MQ resin) | | 20.49 | 13.19 | |
| Emulsion 16 (no MQ) | | | | 13.68 |
| PHOBOL ® XAN | 2.11 | 3.28 | 2.11 | 2.11 |
| Water | 84.7 | 76.23 | 84.7 | 84.21 |
| Fabric Type: Nylon = N, PES = P | P | N | P | P |
| Weight % on Fabric | 2.5 | 2.5 | 2.5 | 2.5 |

Results

| Sample No. | CE3 | CE4 | CE5 | CE6 |
|---|---|---|---|---|
| Visual Repellency (0 Wash Cycles) | 1.5 | 5 | 2 | 1 |
| Visual Repellency (10 Wash Cycles) | 1.5 | 1 | 2 | 1 |
| Softness | 2.5 | | 2 | |
| Tape Adhesion (g) | | >4000 | | |
| Tape Adhesion, St. Dev. (g) | | N/A | | |

As illustrated by the above testing results, the subject emulsions as represented by IE1-IE17 showed improved water repellency as compared with comparative emulsions CE1-CE6. This superior performance is particularly evident from the visual repellency data after 10 wash cycles. In particular, CE1 demonstrates the role of the organic polymer; CE2 demonstrates the role of the subject IPN structure vs. distinct particles having either inorganic or an organic polymer; CE3 demonstrates the impact of using an organic polymer with too low of Tg; CE4-5 demonstrate the impact of using an MQ resin with too low of Mw and finally CE6 demonstrates the role of the MQ resin.

The invention claimed is:

1. An aqueous emulsion comprising an aqueous continuous phase and a discontinuous oil phase comprising particles having an interpenetrating network (IPN) comprising:
   i) at least 10 wt % MQ resin substantially free of radically polymerizable functional groups;
   ii) at least 25 wt % polyorganosiloxane; and
   iii) from 1 to 50 wt % organic polymer having a glass transition temperature of from 0 to 150° C.

2. The emulsion of claim 1 wherein the organic polymer is a reaction product of ethylenically unsaturated organic monomers.

3. The emulsion of claim 2 wherein the ethylenically unsaturated organic monomers are selected from one or more of: acrylates, vinyl esters, vinyl aromatics, olefins, 1,3-dienes, and vinyl halides.

4. The emulsion of claim 2 wherein the ethylenically unsaturated organic monomers comprise acrylates and vinyl aromatics.

5. The emulsion of claim 1 wherein the weight ratio of MQ resin to polyorganosiloxane is from 1:0.5 to 1:5.

6. The emulsion of claim 1 wherein the MQ resin has a weight average molecule weight of from 8000 to 50,000 and the polyorganosiloxane has a weight average molecular weight of from 500 to 100,000.

7. The emulsion of claim 1 wherein the MQ resin has a number ratio of M siloxy units to Q siloxy unit greater than 0.7:1.

8. The emulsion of claim 1 further characterized by being substantially free of cyclic siloxanes.

9. A method of making an aqueous emulsion comprising an aqueous continuous phase and a discontinuous oil phase including the steps of:
   (1) obtaining or preparing an aqueous emulsion comprising a discontinuous oil phase comprising particles which comprise: i) MQ resin substantially free of radically polymerizable functional groups; ii) polyorganosiloxane; and iii) ethylenically unsaturated organic monomers selected from one or more of: acrylates, vinyl esters, vinyl aromatics, olefins, 1,3-dienes, and vinyl halides;
   (2) polymerizing the ethylenically unsaturated organic monomers to form an interpenetrating network within the particles.

10. The method of claim 9 wherein the step of polymerizing comprises the steps of adding an initiator to the emulsion and heating the emulsion.

11. A textile coated according to the method of claim 9.

* * * * *